United States Patent [19]

Abdul

[11] Patent Number: 5,311,664
[45] Date of Patent: May 17, 1994

[54] POWER SKINNING KNIFE WITH UNIDIRECTIONAL ROTATING BLADE

[75] Inventor: Michael A. Abdul, Middletown, Conn.

[73] Assignee: Jarvis Products Corporation, Middletown, Conn.

[21] Appl. No.: 984,443

[22] Filed: Dec. 2, 1992

[51] Int. Cl.⁵ .......................... B26B 7/00; B26B 9/00
[52] U.S. Cl. ............................................ 30/276; 30/347
[58] Field of Search ................ 30/276, 347; 83/174; 452/132, 133, 125; 401/261; 76/81.7, 82, 86

[56] References Cited

U.S. PATENT DOCUMENTS

| | | | |
|---|---|---|---|
| 1,192,451 | 7/1916 | Pfefferkorn | 452/133 |
| 1,255,657 | 2/1918 | Steinheimer | 452/133 |
| 1,506,510 | 8/1924 | Thuau | 452/133 |
| 1,604,692 | 10/1926 | Hausamann | 452/133 |
| 1,796,463 | 3/1931 | Kaltenbach et al. | |
| 1,876,075 | 5/1932 | Reichert, Sr. et al. | |
| 1,887,447 | 11/1932 | Balinger | 401/261 |
| 2,751,680 | 6/1956 | Wezel | 30/219 |
| 2,883,746 | 4/1959 | Gilsi | 30/205 |
| 2,974,413 | 3/1961 | Williams | 30/219 |
| 3,073,027 | 1/1963 | O'Neilly | 30/216 |
| 3,165,833 | 1/1965 | Logan | 30/206 |
| 3,176,397 | 4/1965 | Schuhmann | 30/219 |
| 3,277,572 | 10/1966 | Eickenberg | 30/206 |
| 3,435,522 | 4/1969 | Wezel et al. | 30/219 |
| 3,739,474 | 6/1973 | Umholtz | 30/215 |
| 4,368,560 | 1/1983 | Wetzel et al. | 17/21 |
| 4,472,880 | 9/1984 | Johansson | 30/347 |
| 4,901,400 | 2/1990 | Karubian | 17/21 |
| 4,942,665 | 7/1990 | McCullough | 30/276 |
| 5,101,704 | 4/1992 | Jones et al. | 83/174 |
| 5,122,092 | 6/1992 | Abdul | 452/133 |

FOREIGN PATENT DOCUMENTS 1098626 3/1955 France .

*Primary Examiner*—Richard K. Seidel
*Assistant Examiner*—Paul M. Heyrana
*Attorney, Agent, or Firm*—DeLio & Peterson

[57] ABSTRACT

A power skinning knife having a single substantially disc shaped blade driven in continuous unidirectional rotary motion with a pair of blade shields on opposite sides of the blade covering most of the blade and exposing only a limited depth arcuate cutting region of the blade between the perimeter of the shield and the cutting edge. The blade is driven by a pneumatic motor that is geared to turn first and second toothed pulleys connected by a toothed belt. The blade may be circular or lobed and mounted concentrically or offset to provide either a smooth or pulsing cutting action. The tool may also include a wiping element which removes debris from the blade edge before it enters the tool housing and a steeling element which can be actuated by the operator's thumb while the tool is being used to sharpen the blade.

22 Claims, 3 Drawing Sheets

POWER SKINNING KNIFE WITH UNIDIRECTIONAL ROTATING BLADE

BACKGROUND OF THE INVENTION

1. Field of the Invention

This invention relates to power skinning knives for removing the hide of animals during meat processing. More specifically, this invention relates to pneumatically powered skinning knives which use a disc-shaped rotating cutting blade.

2. Description of Related Art

Modern power skinning knives used in meat processing operations are commonly based upon a design in which a pair of disc-shaped toothed blades are driven in opposed cutting oscillations, with the teeth on the blades cutting in scissors fashion. A pair of pushrods mounted on an eccentric shaft drive the blades oppositely. As one blade turns clockwise the other turns counterclockwise until the teeth on one blade pass the teeth on the adjacent blade. The blades then reverse, with the total rotation angle of each blade being only a few degrees. The drive mechanism is operated by a pneumatic motor mounted in the handle of the tool.

This basic configuration has been developed and improved over time resulting in a tool which is reliable, easy to use and easy to maintain. An example of a tool with this general configuration is found in U.S. Pat. No. 5,122,092 issued Jun. 16, 1992. Earlier versions of skinning knives with this counter-oscillating toothed blade design are seen in U.S. Pat. Nos. 4,901,400; 3,739,474; 3,435,522; 4,368,560; 3,176,397; 3,073,027; 2,974,413 and 2,751,680.

An alternative, but less popular, design also uses a pair of toothed blades, however, instead of counter-oscillating, the blades counter-rotate. As the blades move continuously in opposite directions, the teeth repeatedly pass each other, again acting in scissors fashion. This closely related competing design is exemplified in U.S. Pat. Nos. 3,165,833 and 3,277,572.

Importantly, tools with the scissors cutting action have a good cutting "feel" for the operator, allowing him to rapidly guide the tool between the hide and the carcass without damaging either. This "feel" is better than is obtained with the smooth blade of a simple unpowered skinning knife which may inadvertently penetrate the hide or quickly cut too deep, removing valuable meat from the carcass.

Although both of these powered knife configurations are generally successful, they have certain similar problems. The first is that the toothed blades of these designs are relatively difficult to sharpen and expensive to make and replace. The cost and difficulty is compounded by the fact that there are two blades to be sharpened.

A disadvantage in the counter-oscillating design, although that design has proven to be more successful than the counter-rotating design, is that due to the small angle of rotation of the blade, the front of the blade does most of the work. This wears the front of the blade prematurely and requires that the blade be rotated or resharpened frequently.

The counter-oscillating design also has a difficulty in that it induces some vibration into the tool due to the oscillating mass of the pushrods. Although these oscillations can be minimized with careful design, as was done in the design in U.S. Pat. No. 5,122,092, they cannot be completely eliminated.

The present design addresses these problems, and in doing so provides other advantages that are not found in the prior art. Accordingly, it is an object of the present invention to provide a power skinning knife with a blade that distributes its wear uniformly over its cutting edge.

Another object of the invention is to provide a power skinning knife in which the blade can be easily sharpened while it is being used.

Still another object of the invention is to provide a power skinning knife in which the blade is relatively inexpensive to manufacture and to replace.

A further object of the invention is to provide a power skinning knife with a single blade instead of dual blades.

Yet another object of the invention is to provide a power skinning knife with reduced vibration as compared to counter-oscillating designs.

Another object of the invention is to provide a power skinning knife with good cutting feel and cutting depth control to prevent inadvertent deep cuts into the carcass or cuts through the hide.

SUMMARY OF THE INVENTION

In keeping with these objects and other objects of the invention which will become apparent hereinafter, the present invention comprises a power skinning knife having a handle with the motor mounted therein and a substantially disc shaped blade mounted for continuous unidirectional rotary motion about an axis of cutting rotation. A blade shield is provided covering a central region of the blade and exposing a limited depth arcuate cutting region of the blade between the perimeter of the shield and the cutting edge of the blade. A drive mechanism is connected between the blade and the motor for rotating the blade about the axis of the cutting rotation.

In the preferred embodiment, the blade shield comprises first and second blade shield halves positioned on opposite sides of the blade, each blade shield half covering a portion of its side of the blade and exposing a limited depth cutting region along the cutting edge on its side of the blade. However, the blade shield may be implemented on only one side of the blade, or only a portion of the blade's cutting edge may be shielded.

The blade shield provides an improved cutting feel, as compared to a naked and unshielded blade, and acts to prevent the blade from gouging into the carcass of the animal or cutting out of the hide. As the blade cuts between the hide and the carcass, the hide slides smoothly above the blade and the carcass slides smoothly below it, as permitted by the flexibility of the animal hide.

However, if the blade inadvertently enters the carcass and begins to cut the meat, the blade shield provides an almost immediate difference in the feel of the cut due to the shallow cutting region exposed along the blade edge. This difference signals the operator to redirect the blade as necessary back onto the proper line of cut between the hide and the carcass.

In the more highly preferred design, the drive mechanism is formed by first and second toothed pulleys connected by a toothed belt of the type which is often found in the timing mechanism of equipment.

The cutting edge of the blade is preferably smooth in either a perfectly circular configuration or in a smoothly varying lobed design. It may be mounted with the center of the blade concentric with the axis of cutting rotation or with the blade center slightly offset therefrom to provide a pulsing cutting action.

The lobed variation or offset may be very slight, or they may be large enough that the blade repeatedly retracts behind the blade shield. Other improvements in the tool include a wiping element which wipes the blade clean as it rotates to remove debris before the blade edge enters the tool housing, and a steeling element which can be actuated by the operator's thumb while the tool is being used to bring one or more steeling elements into contact with the rotating cutting edge of the blade and to sharpen the blade as it is being used.

BRIEF DESCRIPTION OF THE DRAWINGS

For a fuller understanding of the invention, reference should be made to the following description taken in connection with the accompanying drawings in which.

DESCRIPTION OF THE PREFERRED EMBODIMENTS

Figure 1:
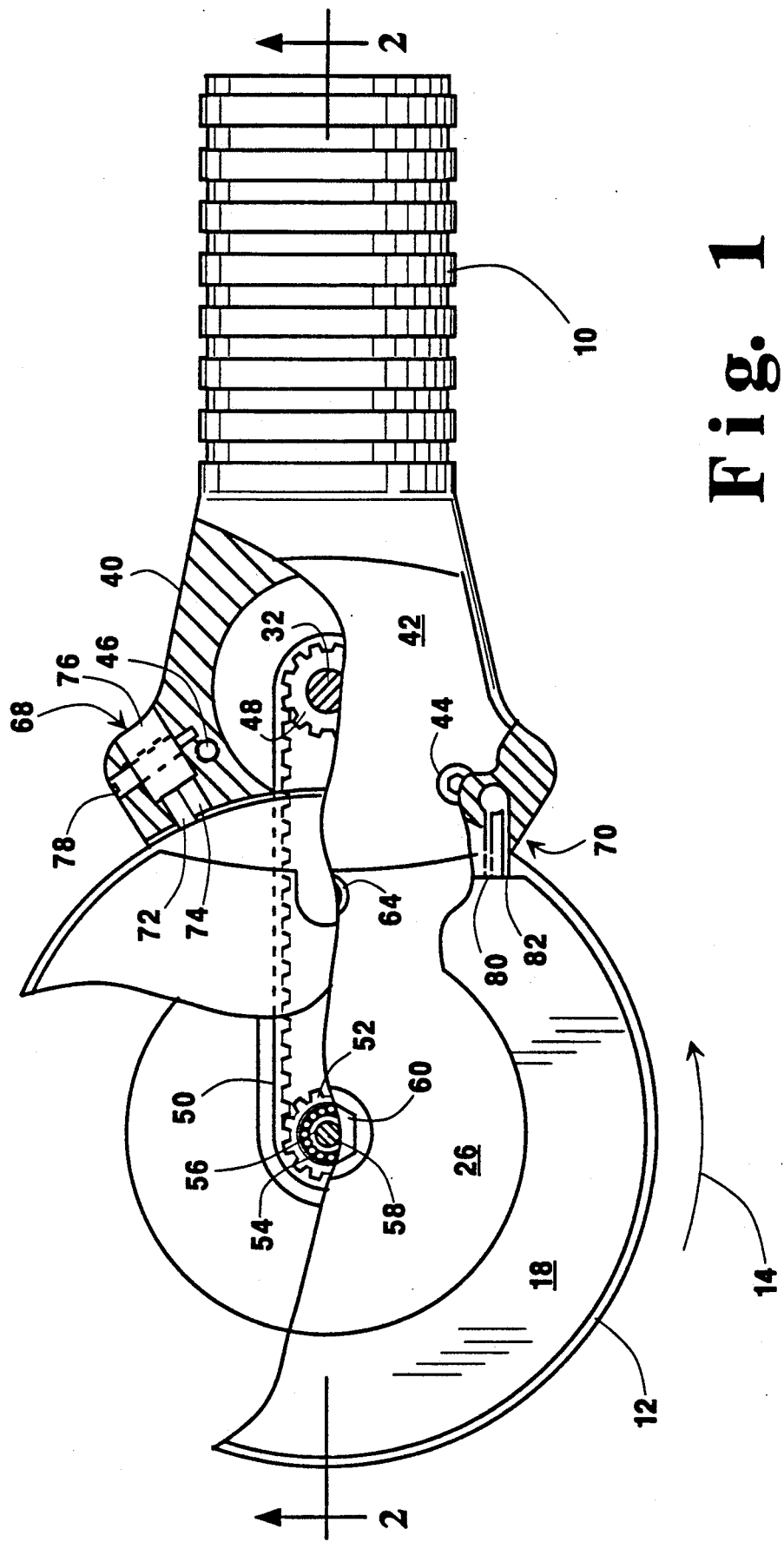
FIG. 1 is a top plan view, a portion of the blade cover, drive cover, blade and blade shield being cut away to show the interior of the knife.
Figure 2:
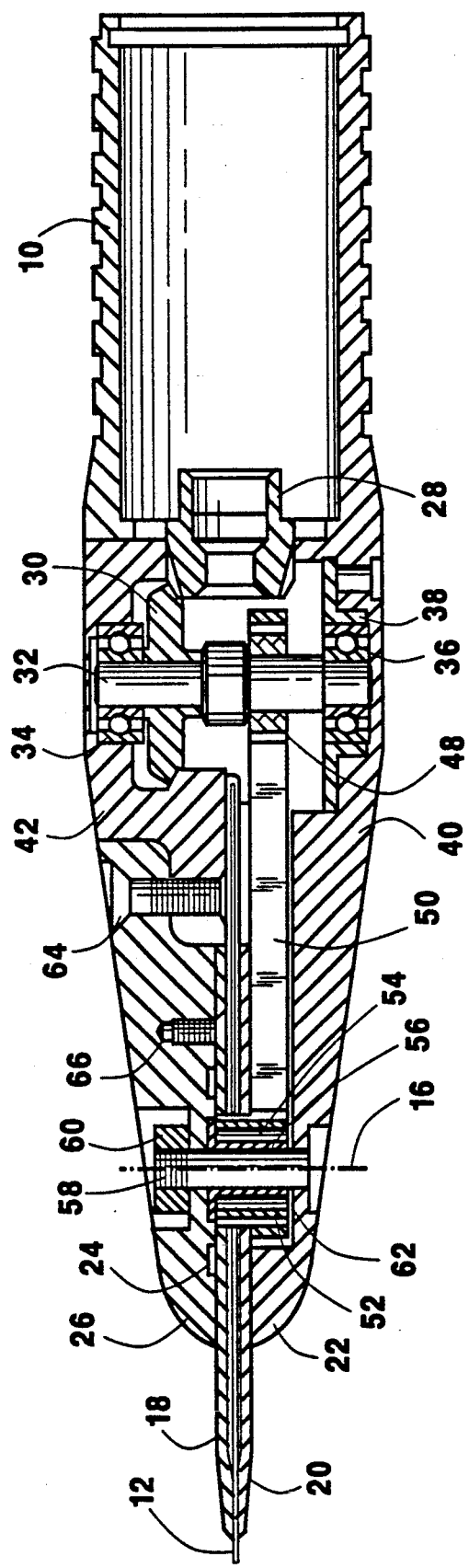
FIG. 2 is a cross-sectional view along the line II—II in FIG. 1.

Referring to FIGS. 1 and 2, the power skinning knife comprises a hollow handle 10, a substantially disc shaped blade 12, mounted for continuous unidirectional rotary motion in the direction marked with arrow 14, about an axis of cutting rotation 16. The top and bottom surfaces of the blade 12 are almost completely hidden by upper and lower blade shields 18, 20 which expose an arcuate cutting region of a limited depth along the blade edge.

The lower blade shield 20 is mounted to the lower blade cover 22 and does not rotate relative to the handle 10 or the remainder of the knife. The upper blade shield half 18 is pressed lightly down into contact with the rotating blade 12 by wave spring 24 which is held in position in a groove in the upper blade cover 26.

The upper blade shield is loosely held by flat headed machine screw 66 which passes through the upper shield through a hole with beveled sides to match the bevel of the underside of screw 66. The hole is slightly larger than the base of the screw, but smaller than the diameter of the head of screw 66 so that the upper blade shield 18 is trapped by the screw 66, but is able to "float" slightly around the head of the screw. This permits the blade shield to remain in close contact with the blade below it.

Preferably, the first and second blade shields 18, 20 are in contact with the upper and lower sides of the blade 12 only at their perimeters. The inner sides of the shield halves are slightly hollowed in the central region so that they do not contact the blade 12 in that area. This reduces friction between the rotating blade and the shield and helps to ensure a tight contact at the perimeter of the blade shield to prevent dirt, blood, hair or other contaminants from entering the drive mechanism.

Except for the very coarsest type of cutting operation, the blade shield halves 18, 20, have a diameter which is at least 75 percent and preferably greater than 90 percent of the diameter of the blade 12. The blade shield shown in the drawings has a diameter of about 95 percent of the blade. The difference between the diameters of the blade and the shield defines an arcuate cutting region for the blade along the cutting edge. This region has a limited cutting depth which is equal to the difference between the radius of the blade and the radius of the blade shield.

This depth limitation helps to prevent the blade from cutting deeply into the muscle tissue of the carcass when the hide is being removed. If the blade inadvertently enters the muscle tissue, the cutting action changes as the blade shield contacts the muscle tissue, which provides feedback to the operator of the tool to redirect the cut.

The action of the blade shield significantly alters the cutting action of the blade as compared to a naked unshielded blade, and provides the needed control for high volume production use of the tool. In the preferred design, the blade shield does not rotate. However, designs in which the shield rotates with the blade are also contemplated within this invention.

The disc blade 12 is driven by a pneumatic motor (not shown) located within the interior of the hollow handle 10. Suitable pneumatic motors are well known in the art and are widely used in handheld pneumatically operated tools. An example of a motor that is suitable for use in this tool is found in U.S. Pat. No. 5,122,092.

Such motors have an output shaft aligned with the longitudinal axis of the skinning knife that projects into the drive mechanism region of the tool between the handle and the blade. Power from the motor shaft is transmitted to the blade 12 through the drive mechanism. In the preferred design, the drive mechanism includes a pair of toothed pulleys, a toothed belt and a set of gears. An alternative design may use only gears.

The output shaft of the pneumatic motor drives pinion gear 28 which spins around a longitudinal axis. The pinion gear 28 engages and turns crown gear 30 which spins around a lateral axis, parallel to the axis of rotation of the blade. The crown gear 30 is mounted on shaft 32 between upper and lower bearings 34, 36.

The upper bearing 34 is mounted in drive cover 42 which is connected to housing 40 by means of bolts 44 and 46. The housing 40 is generally located between the lower blade cover 22 and the handle 10. If the bearing becomes damaged, it may be removed, and relatively easily replaced. If it should freeze up and damage the drive mechanism cover in which it is mounted, that too can be easily replaced.

The lower bearing 36, however, is not mounted directly in the housing 40. Instead, it is mounted in a removable bearing sleeve 38. The removable sleeve avoids replacing the housing 40 if the bearing 36 freezes up and damages its mounting. As shown in FIG. 2, the lower blade cover 22, the housing 40 and the hollow handle 10 are all formed as an integral one piece component, which is expensive to replace if damaged by a bearing failure.

In the preferred design, power is transmitted from shaft 32 to the blade 12 via a first toothed pulley 48 and a toothed belt 50. The toothed belt 50 engages a second toothed pulley 52 which rotates around the cutting axis 16. The toothed belt provides quiet operation while still transmitting the power efficiently to the blade.

In an alternative design, both the first and second toothed pulleys 48 and 52 are replaced by simple gears, and the function of the toothed belt 50 is replaced by an intermediate large diameter idling gear mounted for rotation underneath the blade 12 about a stub shaft projecting upwards from the housing 40. In this design (not shown), the power is transmitted from the first gear to the idler gear, in the same manner as power is transmitted from the first toothed pulley to the toothed belt in the design illustrated in FIGS. 1 and 2. Other drive mechanisms may also be used to spin the blade around the axis of cutting rotation.

The second toothed pulley 52 is mounted on a bearing 54 which is in turn mounted on a bearing spacer 56. The bearing spacer 56 is mounted on a blade shaft screw 58 which projects through the blade cover 22, through the rotating blade 12 and up into the upper blade cover 26 where it is retained by blade shaft nut 60.

A thrust washer 62 is located below the bearing 54. Machine screw 64 holds the upper blade cover 26 to the drive cover 42 and machine screw 66 holds the upper blade shield 18 to the upper blade cover 26 as previously described.

A thumb actuated steeling element, generally indicated with reference numeral 68, and a wiper, generally indicated with reference numeral 70, are mounted between the drive cover 42 and the housing 40. The steeling element 68 includes first and second steeling element portions 72, 74 mounted on a sliding button 76. The sliding button 76 is retained within its sliding pathway by means of a retainer screw 78.

When the skinning knife is in use, the operator's thumb lies close to the steeling button 76. Any time it is desired to sharpen the blade 12, the operator may depress the steeling button to bring the first and second steeling element portions 72, 74 into contact with the rotating cutting edge of blade 12. Although not shown in the drawings, the steeling button 76 is preferably spring loaded to retract the steeling portions 72, 74 from the blade when the steeling element is not in use.

The wiper 70 includes a pair of flexible fingers 80, 82 as may be seen in the lower cutaway portion of FIG. 1. The fingers are mounted near the cutting edge of the blade at a point after the cutting edge has rotated through substantially all of the cutting region. The fingers are mounted such that they flex into wiping contact with opposite sides of the cutting edge of the blade to remove contaminants from the surface of the blade before it enters the tool.

Figure 3A:
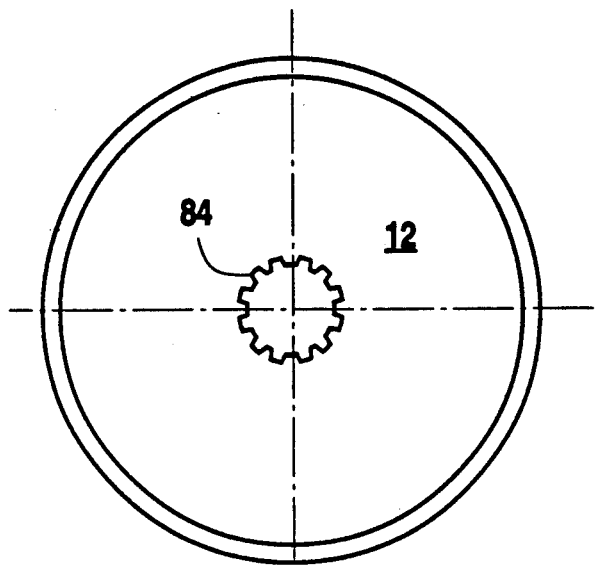
FIG. 3 shows three (3) alternative embodiments of the blade including a round concentric blade in FIG. 3(a), a lobed concentric blade in FIG. 3(b), and a round concentric blade mounted on an eccentric driver in FIG. 3(c).
Figure 3B:
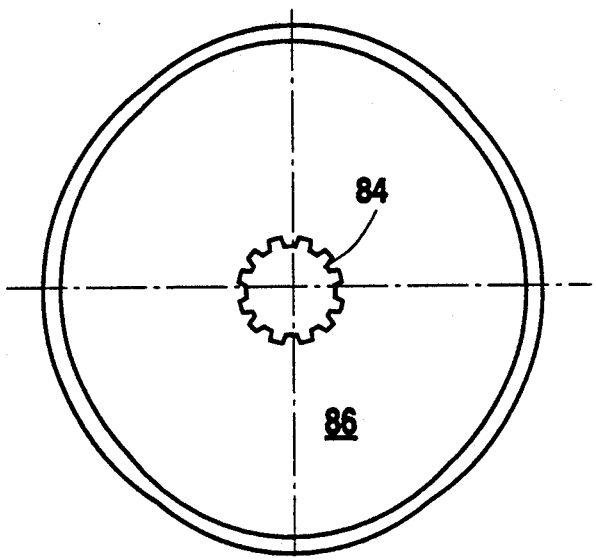
Figure 3C:
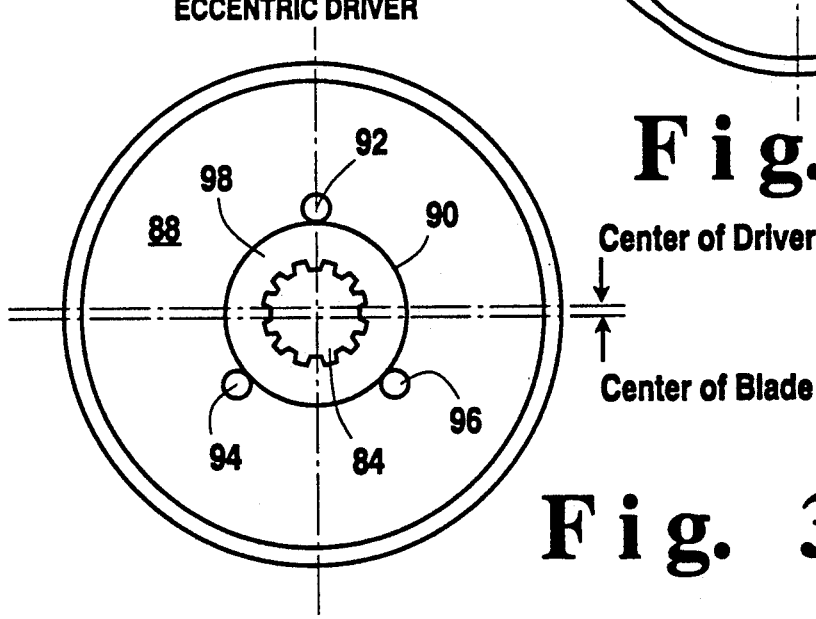

Various alternative configurations for the blade are shown in FIGS. 3(a) to 3(c). A circular blade 12, shown in FIG. 3(a), has the center of the blade concentric with the axis of cutting rotation. this blade is illustrated in the tool in FIGS. 1 and 2 and operates well in the skinning knife as previously described. This is the simplest design to manufacture, sharpen and use, and is effective for most cutting operations. The blade 12 of FIG. 3(a) includes a toothed opening 84 which fits over the toothed pulley 52. As the pulley rotates, its teeth engage the blade 12 and drive it continuously in one direction of rotation.

While the round concentric blade shown in FIG. 3(a) operates well, the lobed concentric blade 86 shown in FIG. 3(b) may be preferable in some cutting operations. The lobes, six (6) of which are shown on the blade of FIG. 3(b), cause the cutting edge of the blade to pulse radially in and out at each point along the arcuate cutting region of the tool. As the maxima, then the minima of each lobe alternately pass by a point in the cutting region, the blade appears to move radially in and out relative to the shield.

The difference in the diameter of the blade from the minima to the maxima of each lobe may be varied in different blades such that the inward retraction of the blade is greater or less than the cutting depth. When it is greater than this depth, the cutting edge of the blade will retract completely between the blade shield halves after each outward pulsation. With the blade shown in FIG. 3(b), six (6) pulses occur at each rotation. Other numbers of lobes may also be used when making the blade.

An alternative blade design 88 which also produces a pulsing cutting action is shown in FIG. 3(c). The blade 88 in FIG. 3(c) is perfectly circular, like the 3(a) blade, but it is driven off center from the axis of rotation, causing the entire blade to shift back and forth as it rotates. The blade has a central opening 90 which is generally circular and concentric with the blade.

The opening 90 has a plurality of notches 92, 94 and 96 cut into the interior perimeter of the opening 90 which are engaged by corresponding projections on a driver piece 98. The driver piece 98 may be removed from the opening 90 and repositioned at any one of three (3) different orientations relative to the three notches 92, 94 and 96.

The driver piece has a toothed opening 84, as in the blade designs in FIGS. 3(a) and 3(b), however, the center of the opening is offset slightly towards the edge of the blade. When the driver piece 98 is placed in blade 88 and installed in the tool, the offset causes the blade to pulse in and out relative to the blade shield on each revolution of the blade in a manner similar to the pulsing action of the lobed concentric blade 86.

This pulsing cutting action causes slighter greater wear on the blade 88 in the direction of the offset. The wear can be more uniformly distributed around the blade, and the blade life extended, by removing the driver insert 98 and rotating it relative to the notches in the blade 88. This realigns the direction of the offset and changes the point of wear on the perimeter of the blade 88.

The blade design in FIG. 3(c) has the advantage that the circular blade is easy to manufacture and sharpen. Moreover, a variety of interchangeable driver pieces may be provided with different offsets. In one driver piece, the opening 84 may be concentric with the blade (zero offset) and the blade will operate in the same way as the blade in FIG. 3(a). Alternatively, the offset may be increased to the point where the blade completely retracts behind the blade shield on each pulse.

While this invention has been described with reference to specific embodiments, it will be recognized by those skilled in the art that variations are possible without departing from the spirit and scope of the invention.

Thus, having described the invention, what is claimed is:

1. A power skinning knife comprising:
  a handle;
  a single substantially disk shaped blade having a center offset from an axis of cutting rotation, the blade being mounted for offset rotation about the axis of cutting rotation;
  a non-rotating blade shield covering a central region of the blade and exposing a limited depth arcuate cutting region of the blade between the perimeter of the shield and the cutting edge of the blade, the depth of the arcuate cutting region varying as the offset blade rotates;
  a motor mounted in the handle; and a drive mechanism connected between the blade and the motor for rotating the blade in a continuous unidirectional rotary motion about the axis of cutting rotation.

2. A power skinning knife according to claim 1 wherein the blade shield comprises first and second blade shield halves positioned on opposite sides of the blade, each blade shield half exposing only a limited depth arcuate cutting region on its side of the blade.

3. A power skinning knife according to claim 2 wherein the first and second blade shield halves contact the blade about their inner perimeters.

4. A power skinning knife according to claim 2 further including a spring mounting means for one blade shield half to hold the blade shield firmly against the blade.

5. A power skinning knife according to claim 1 wherein the blade shield is substantially disc shaped and has a diameter that is at least seventy five percent of the diameter of the blade.

6. A power skinning knife according to claim 5 wherein the blade shield has a diameter that is greater than ninety percent of the diameter of the blade.

7. A power skinning knife according to claim 1 wherein the blade includes a plurality of lobes.

8. A power skinning knife according to claim 1 wherein the blade is mounted on a blade driver that rotates about the axis of cutting rotation, the center of the blade driver being offset from the axis of cutting rotation, and the center of the blade being aligned with the center of the blade driver.

9. A power skinning knife according to claim 8 wherein the blade is rotatably repositionable about its center on the blade driver to a plurality of mounting positions.

10. A power skinning knife according to claim 9 wherein the blade is circular.

11. A power skinning knife according to claim 1 wherein the drive mechanism comprises:
a first pulley driven by the motor;
a second pulley connected to the blade; and
a belt connected between the first and second pulleys.

12. A power skinning knife according to claim 11 wherein the belt, the first pulley and the second pulley are toothed.

13. A power skinning knife according to claim 11 wherein the drive mechanism further includes:
a first gear connected to a motor drive shaft extending from the motor; and
a second gear connected to the first pulley and driven by the first gear.

14. A power skinning knife according to claim 1 further including a wiper positioned in wiping contact with the rotating cutting edge of the blade.

15. A power skinning knife according to claim 14 wherein the wiper comprises a pair of flexible fingers mounted proximate the cutting edge of the blade at a point after the blade cutting edge has rotated through substantially all of the cutting region, the flexible fingers flexing into wiping contact with opposite sides of the cutting edge of the blade.

16. A power skinning knife according to claim 1 further comprising a pair of blade covers, one on each side of the blade, overlapping the blade shield and extending around the axis of cutting rotation to a point short of the cutting region.

17. A power skinning knife according to claim 16 wherein the handle, blade, blade shield and blade covers define an exterior configuration of the knife that is substantially symmetrical about a plane defined by the blade.

18. A power skinning knife comprising:
a single substantially disk shaped blade having a center offset from an axis of cutting rotation mounted for rotation in a cutting plane about an axis of cutting rotation;
a handle having a centerline coplanar with the cutting plane;
a pair of blade shields covering opposed central regions of the blade and exposing a limited depth arcuate cutting region of the blade between the perimeters of the blade shields and the cutting edge of the blade, the blade, handle and blade shields being substantially symmetrical about the cutting plane;
a motor mounted in the handle; and
a drive mechanism connected between the blade and the motor for rotating the blade in a continuous unidirectional rotary motion about the axis of cutting rotation, the drive mechanism comprising:
a first pulley driven by the motor;
a second pulley connected to the blade; and
a belt connected between the first and second pulleys.

19. A power skinning knife according to claim 18 wherein the belt, the first pulley and the second pulley are toothed.

20. A power skinning knife according to claim 18 wherein the drive mechanism further includes:
a first gear connected to a motor drive shaft extending from the motor; and
a second gear connected to the first pulley and driven by the first gear.

21. A power skinning knife according to claim 18 further including:
a steeling element; and
means for moving the steeling element, said means for moving the steeling element being operable by hand while the handle is being held to bring the steeling element into contact with the rotating cutting edge of the blade.

22. A power skinning knife according to claim 21 wherein the steeling element includes first and second steeling element portions, the steeling element portions contacting the cutting edge of the blade when the means for moving the steeling element brings the steeling element into contact with the cutting edge.

* * * * *